United States Patent [19]

Schaefer et al.

[11] 3,965,563
[45] June 29, 1976

[54] METHOD AND APPARATUS FOR REMOVING CUTTING BLADES FROM AN ANNULAR CUTTING HEAD

[75] Inventors: William L. Schaefer, Gibsonia; Thomas J. Briar, Trafford, both of Pa.

[73] Assignee: PPG Industries, Inc., Pittsburgh, Pa.

[22] Filed: May 8, 1975

[21] Appl. No.: 575,903

[52] U.S. Cl............................. 29/427; 29/200 D; 29/401 F
[51] Int. Cl.² ........................................ B23P 19/02
[58] Field of Search ............. 29/427, 401 R, 401 F, 29/200 D

[56] References Cited
UNITED STATES PATENTS

| 3,101,688 | 8/1963 | Negola et al. | 29/401 X |
| 3,193,916 | 7/1965 | Brunell et al. | 29/401 X |
| 3,293,734 | 12/1966 | Buckley | 29/427 X |
| 3,309,765 | 3/1967 | Kirsten | 29/200 D X |
| 3,842,477 | 10/1974 | Hunkeler | 29/200 D |

Primary Examiner—Victor A. DiPalma
Attorney, Agent, or Firm—John E. Curley; Robert DeMajistre

[57] ABSTRACT

An apparatus for removing cutting blades from the periphery of an annular cutting head is disclosed which is comprised of a working table on which the cutting head is mounted and a pair of free wheeling cam members positioned to contact the blades at their portions which extend beyond the width of the cutting head. The curved portion of the cam members contact the edges of the blades while the cutting head is rotated and the blades are simultaneously moved away from the cam members. The curved surface of the cam members force the blades from their mounting in the cutter head as the head is rotated.

7 Claims, 3 Drawing Figures

U.S. Patent  June 29, 1976  3,965,563
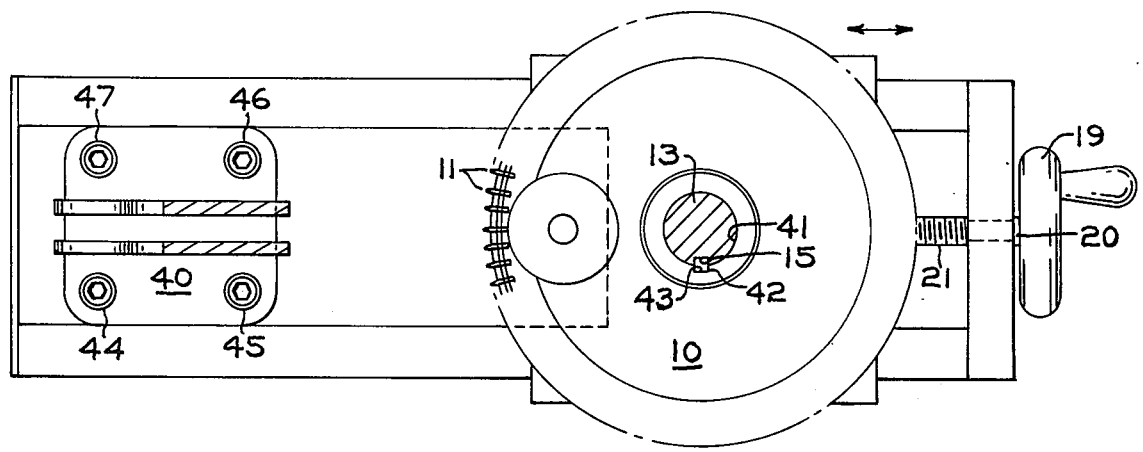
Fig.2
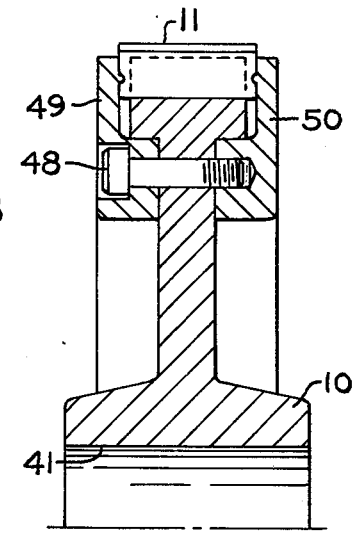
Fig.3
Fig.1
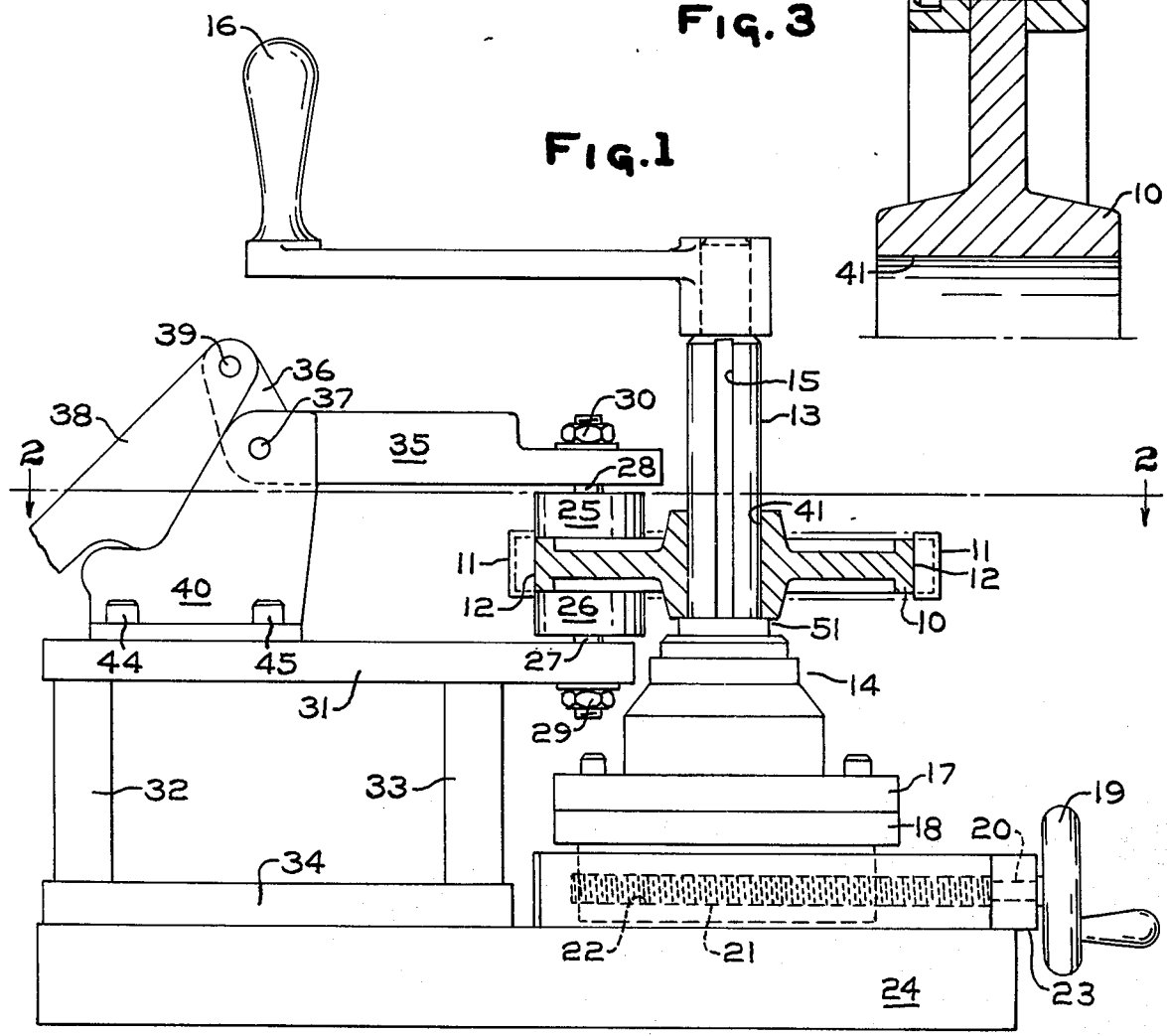

METHOD AND APPARATUS FOR REMOVING CUTTING BLADES FROM AN ANNULAR CUTTING HEAD

BACKGROUND OF THE INVENTION

This invention relates to the removal of cutting blades from the periphery of an annular cutting head.

The chopping of glass fibers during formation such as disclosed in U.S. Pat. No. 3,869,268 and which is incorporated herein by reference, is an effective method of forming particulate fiber glass strand. In a typical process, glass fibers are formed at a fiber forming bushing, sized with an aqueous sizing composition, gathered into strand, and passed between cutting blades and a backup roll which chops the strand into particulate glass fiber bundles. The cutting blades usually constructed of razor stock are, removably mounted in slots on an annular plate. These blades have a finite life, therefore, necessitating the removal and reinsertion of new blades in the cutting head periodically.

Because the glass fibers are being chopped during formation and are wet with the size or binder used to condition the fibers, the cutting blades have a tendency to accumulate the binder solids thereon. Difficulty is often encountered in removal of the spent blades from the cutting head because of the presence of these solids.

One problem associated with the removal of the cutting blades is that if one end of the cutting blade is forced from its mounting in the cutting head, the blade will have a tendency to cock and be wedged within its mounting causing it to break. Broken blades in the mounting cause severe problems in the removal of the remainder of the blade within that mounting.

Thus, there has been a need for a method and apparatus for the efficient removal of cutting blades mounted in slots in an annular plate in this art.

THE INSTANT INVENTION

In accordance with the instant invention, a method and apparatus is provided which effectively and efficiently removes cutting blades from their mounting within the slots in the periphery of a cutting head without encountering the breaking of the blades or the marring of the cutting head itself.

The instant invention provides an apparatus for removing cutting blades from the periphery of an annular cutting head where the cutting blades are longer than the thickness of the cutting head. This apparatus is comprised of a working table for mounting the cutting head thereon so that the cutting head may be rotated about its axis, and a pair of free wheeling cam members positioned so that they contact the cutting blades at the extremities thereof extending beyond the width of the cutting head. The curved portion of the free wheeling cam members contact the edges of the blade and force the blades out of their mounting by moving the working table or the cam members away from each other while rotating the cutting head.

DESCRIPTION OF THE DRAWING

The invention will be more readily understood by reference to the accompanying drawing in which:

FIG. 1 is a side elevation view, partially in section, of the apparatus of the invention having a cutting head mounted thereon for blade removal.

FIG. 2 is a cross-section of FIG. 1 taken along line 2—2 with the cutting head partially broken away to show the blade.

FIG. 3 is an enlarged cross-section of the cutting head with a blade mounted therein shown in FIG. 1.

Referring now to FIG. 1, there is shown a cutting head 10 with a plurality of cutting edges or blades 11 mounted in slots 12. The cutting edges 11 extend beyond the thickness of the cutting head 10.

The cutting head 10 is mounted on the shaft 13 which is inserted in the bearing 14. The groove 15 is aligned with the groove in the cutting head, not shown in FIG. 1, so that the shaft 13 is fixedly mounted to the cutting head 11. The shaft 13 is free wheeling within the bearing 14, so that the cutting head 10 can be readily rotated by the handle 16.

The bearing 14 is mounted on a support 17 which is fixedly mounted to the working table 18. The working table 18 can be moved translationally by rotating handle 19 which turns shaft 20 rotating screw 21 which engages slots 22. The shaft 20 is supported by collar 23 fixedly mounted to support surface 24. The cam members 25 and 26 contact the blades 11 at their portions extending beyond the width of the cutting head 12. The cam members 25 and 26 are free wheeling on shafts 27 and 28. The shafts 27 and 28 are secured by nuts 29 and 30. The cam member 26 on shaft 27 is supported on surface 31 which is fixedly mounted by pillars 32 and 33 attached to plate 34. The cam member 25, mounted on shaft 28, is attached to arm 35 connected to pivot 36 by pin 37. The pivot 36 is attached to lever arm 38 by pin 39. The lever arm 38, pivot 36, and supporting arm 35 are supported on the surface 31 by bracket 40 through which pin 37 also traverses.

Referring now to FIG. 2 which is a cross-sectional view taken across line 2—2 of FIG. 1, shaft 13 is shown mounted within the central aperture of 41 of the cutting head 10. Unified movement of the cutting head 10 and the shaft 13 is provided by key 42 inserted in groove 15 of the shaft 13 and groove 43 in the cutting head 12. Cam member 25 rides free on shaft 28 and is shown in contact with cutting edges 11 at their portions which extend beyond the width of the cutting head 10.

The handle 19 is shown attached to shaft 20 which is attached to the rotating screw 21. The bracket 40 is mounted to the support surface by means of bolts 44, 45, 46 and 47.

Referring now to FIG. 3, which is a cross-section of the cutting head 12, with the retaining blade rings thereon, the bolt 48 maintains the retaining rings 49 and 50 which hold the blade 11 in place in the cutting head 10. When bolt 48 is removed, the two retaining rings, 49 and 50, are removed with the blade 11 extending beyond the periphery of the width of the cutting head 10.

In operation, for the removal of the blade 11 from the cutting head 10, lever arm 38 is lifted and cam member 25 is moved away from the assembly. Handle 16 is removed from the apex of the shaft 13 and a cutting head 10 with the blades therein is slipped over the shaft 13 until it contacts the base plate 51. The key 41 is aligned with the grooves 43 and 15 to fixedly attach the cutting head 10 to the shaft 13. The cutting head 10 is then aligned so that the cam member 26 contacts the inside of the blade 11. Adjustment can be accomplished by turning of the handle 19 to translationally align the cam member 26 and the rear of the blade 11. The arm 38 is lowered to place cam member 25 in contact with the edge of blade 11 extending beyond the periphery of the cutting head 10. The handle 16 is replaced on the shaft 13.

The handle 16 is rotated and this action rotates cutting head 10 and simultaneously handle 19 is rotated incrementally which moves the working table 18 with the cutting head 10 mounted thereon away from cam members 25 and 26 which forces the blades 11 out of slots 12 and the cutting head 10. The movement of the cutting head 10 away from the cam members 25 and 26 must be sufficiently small in distance as not to bind or break the cutting edges 11. Usually, three rotations of the cutting head 10 with corresponding travel of the table 18 is sufficient to remove the cutting blades 11 from the slots 12 in the cutting head 10. After removal of the blades 11 from the slots 12 in the periphery of the cutting head 10, the handle 16 is removed from the shaft 13 and lever arm 38 is raised thereby moving cam member 25 and the supporting arms associated therewith, away from the proximity of the cutting head 10. The cutting head 10 may be removed from the shaft or new blades may be placed in the slots 12 of the cutting head 10 before removal from the shaft 13.

After new blades have been mounted in the cutting head, the retaining rings 49 and 50 are replaced on the sides of the cutting head 10 by securing them with a screw 48.

In the preferred operation of the blade removing device, the working table 18 is moved away from the cam members 25 and 26 while there is no rotational movement of the cutting head 10. This translational movement forces the blades 11 in contact with the cam members 25 and 26 partially out of slots 12. The cutting head 10 is rotated one full turn, stopped, and the table 18 is again translationally moved away from the cam members 25 and 26 thereby moving the blades 11 which are in contact with the cam members 25 and 26 further out of slots 12. Cutting head 10 is again rotated. This process is continued until the blades are completely out of the slots 12.

The number of translational adjustments to the working table 18 depends on the diameter of the cam members 25 and 26. Thus, large diameter cam members require less adjustments to the working table than do small diameter cam members, because with the larger diameter cam members less instantaneous force is applied to the cutting blades by the cam members.

In lieu of the handle 16, the shaft 13 could be rotated by a pulley connected to a motor driven power transmission belt or the like.

It is preferred that the cam members 25 and 26 do not contact the cutting head 10 but are spaced slightly therefrom to minimize wear of both the cutting head and cam members.

While the invention has been described with reference to certain specific structural aspects it is within the contemplation of the invention to include the mechanical equivalents of such structural aspects.

Although the invention has been described with reference to certain specific embodiments thereof for illustrative purposes, the invention is not to be limited thereby except insofar as is set forth in the accompanying claims.

We claim:

1. In an apparatus for removing cutting blades from the periphery of an annular cutting head, said blades being longer than the thickness of said cutting head, the combination comprising:
   a working table;
   means for mounting said cutting head on said working table;
   means for rotating said cutting head about its axis;
   a pair of free wheeling cam members positioned to contact said blades at their portions extending beyond the width of the cutting head, the curved portions of said free wheeling cam members contacting the edges of the blades juxtaposed to the cutting edges, one of said cam members being removably mounted and both of said cam members being supported independent of said working table;
   means for moving said cam members and said working table in opposite directions to provide for removal of said blades from said cutting head, when said cutting head is rotated by said cam members thereby forcing said blades out of said cutting head.

2. The apparatus of Claim 1 wherein said means for mounting said cutting head on said working table is a removable shaft engaging the central aperture of said cutting head and mounted within said working table.

3. The apparatus of Claim 2 wherein said means for rotating said cutting head is a handle operatively attached to said removable shaft.

4. The apparatus of Claim 1 wherein said cam members are stationary and said working table is movable.

5. The apparatus of Claim 1 wherein one of said cam members is removably mounted.

6. In the method of removing cutting blades from the periphery of an annular cutting head, said blades being longer than the thickness of said cutting head, the improvement comprising:
   rotating said cutting head with the cutting blades therein;
   contacting said cutting blades at their portions extending outside the width of said cutting head on juxtaposed sides with a pair of cam members,
   moving said cutting head away from said cam members, and rotating said cutting head to force said blades out of their mounting.

7. In the method of removing cutting blades from slots in the periphery of an annular cutting head, said blades being larger than the thickness of said cutting head, the improvement comprising:
   contacting said cutting blades at their portion extending outside the width of said cutting head on juxtaposed sides with a pair of cam members
   a. moving said cutting head away from said cam members to partially disengage said cutting blades from said slots,
   b. rotating said cutting head with the cutting blades therein, and
   repeating steps (a) and (b) until said cutting blades are removed from said slots in said cutting head.

* * * * *